United States Patent [19]

Kimura

[11] 4,382,331
[45] May 10, 1983

[54] HYDRAULIC CUTTER

[75] Inventor: Kiyoshi Kimura, Fujisawa, Japan

[73] Assignee: Kabushiki Kaisha Ogura Chuck Seisakusho, Kanagawa, Japan

[21] Appl. No.: 261,013

[22] Filed: May 6, 1981

[30] Foreign Application Priority Data

Jun. 27, 1980 [JP] Japan ................................. 55-90134

[51] Int. Cl.³ ............................................. B26B 17/00
[52] U.S. Cl. ....................................... 30/180; 30/241
[58] Field of Search ................. 30/180, 182, 228, 241, 30/272

[56] References Cited

U.S. PATENT DOCUMENTS 3,733,699  5/1973  Bock .................................... 30/180
4,208,792  6/1980  Ewig .................................. 30/241 X

*Primary Examiner*—Jimmy C. Peters

[57] ABSTRACT

A hydraulic cutter apparatus provided herein comprises a piston slidably disposed in a cylinder, pumping apparatus for feeding a working fluid to the cylinder thereby axially displacing the piston for cutting operation with a cutting blade mounted at the front end of the piston rod. Release valve apparatus are provided for returning back the working fluid from the cylinder whose inner pressure is thereby lowered, allowing the piston to move back to the home position.

2 Claims, 3 Drawing Figures

HYDRAULIC CUTTER

BACKGROUND OF THE INVENTION

The present invention relates to a hydraulic cutter for cutting metal pipes, reinforcing bars or the like and, more particularly, to a hydraulic cutter having a special type of built-in valve mechanism.

Hydraulic cutters which are easy to carry and handle for cutting reinforcing bars, metal pipes or the like at the construction site have been developed. For example, a hydraulic cutter is known wherein a pump mechanism for forcibly feeding oil from an oil tank is disposed inside a casing main body of the cutter containing the oil tank, and the compressed oil from this pump mechanism is fed to a cylinder to slide a piston head slidably disposed inside the cylinder, thereby linearly displacing a piston rod formed integral with the piston head for performing a cutting operation with a cutting blade mounted at the front end of the piston rod (U.S. Pat. No. 3,733,699).

In this conventional hydraulic cutter, a valve mechanism is incorporated for releasing the compressed oil fed to the cylinder to withdraw the piston head and the piston rod. However, this valve was incorporated at a position shifted from the axis of the piston head. This construction led to various defects. For example, the processing of the piston head was difficult, the precision of the processing was inferior, and the cylinder space for enclosing the valve mechanism had to be made greater. Furthermore, in order to obtain stable and balanced flow of oil, two valve mechanisms are frequently incorporated so that the construction disadvantageously becomes complex and the manufacturing cost becomes high.

SUMMARY OF THE INVENTION

The present invention has been made in consideration of this and has for its object to provide a hydraulic cutter according to which the processing is easy and the manufacturing cost is less by disposing the valve mechanism coaxially with the piston head.

DETAILED DESCRIPTION OF THE PREFERRED EMBODIMENTS

The embodiment of the present invention will now be described by way of examples referring to the accompanying drawings.

Figure 1:
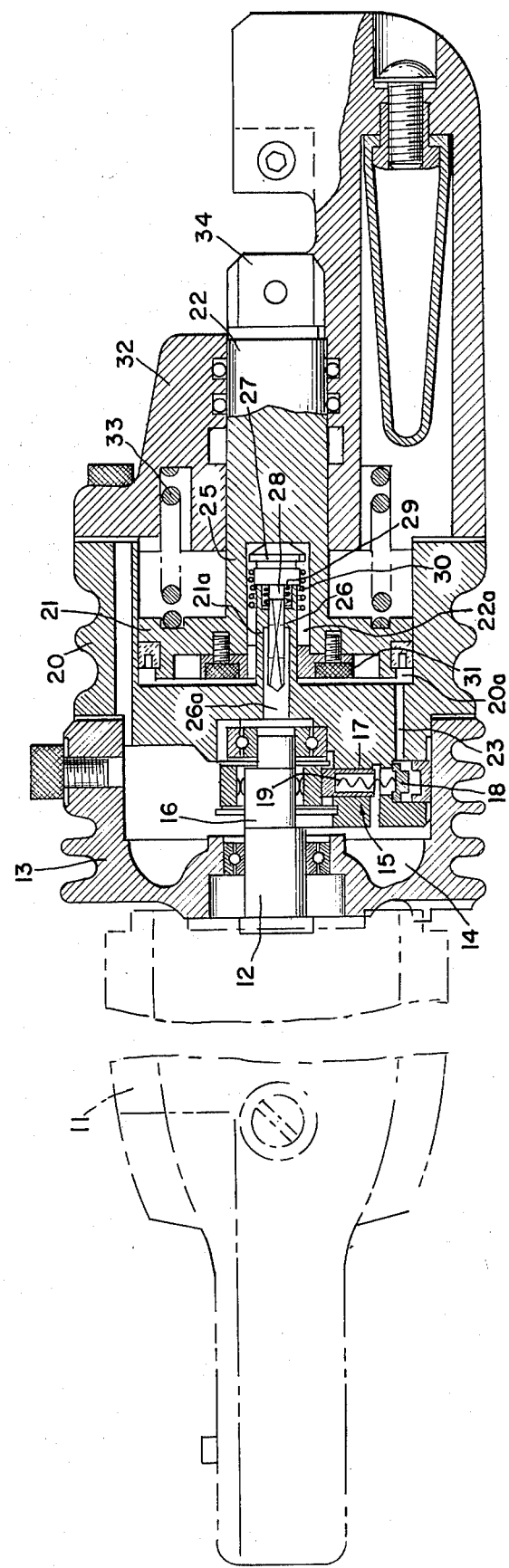
FIG. 1 is a sectional view illustrating a hydraulic cutter of the present invention.

FIG. 1 is a sectional view illustrating one embodiment of the hydraulic cutter of the present invention. Referring to the drawings, reference numeral 11 denotes a motor which is mounted to a casing main body 13 such that a motor shaft 12 is inserted inside the casing main body 13. An oil tank 14 for storing oil is also disposed inside the casing main body 13, and a pump mechanism 15 for forcibly feeding the oil from the oil tank 14 is also disposed therein. The pump mechanism 15 comprises a cam part 16 formed on the motor shaft 12, a piston 17 which is reciprocated through a needle bearing by the cam part 16, and an opening and closing valve 18 disposed in the oil flow path. This opening and closing valve 18 is so constructed as to normally close the oil flow path by a spring 19. Reference numeral 20 denotes a cylinder which is connected to the casing main body 13. A piston head 21 is slidably disposed inside the cylinder 20, and a piston rod 22 is formed integral with the piston head 21 in a coaxial manner. An oil flow path 23 is formed in the cylinder 20 connecting the oil tank 14 with a cylinder interior 20a. This oil flow path 23 is closed by the opening and closing valve 18 as described hereinabove. An oil releasing path is formed in the piston head 21 to connect the cylinder interior 20a with the oil tank 14 outside the cylinder. This oil releasing path can be opened and closed by a valve mechanism 25. In this embodiment, the oil releasing path is formed in the axial direction at the inner wall of the cylinder 20 and comprises a through hole 26a of a guide bar 26 inserted in a central hole 22a of the piston rod 22, and a through hole 21a formed in the piston head 21. The valve mechanism 25 has a valve body 27 which is mounted in the through hole 26a of the guide bar 26 in such a manner that it is axially displaceable by a rod 28. This rod 28 is of circular cross section, with part of it being cut away to allow the oil to flow through. The valve body 27 is normally biased toward the guide bar 26 by the biasing force of a spring 29 so that the through hole 26a of the guide bar 26 and the central hole 22a of the piston rod 22 are blocked. The outer diameter of the valve body 27 is formed to be greater than that of the guide bar 26. A spring 30 is fixed to the valve body 27 at the outer circumference of the guide bar 26. A plate 31 fixed to the center of the guide bar 26 and the piston head 21 is slidable in the axial direction of the guide bar. A spring 33 is interposed between the surface of the piston head facing the side of the piston rod 22 (rear surface of the piston head) and a jaw-shaped casing 32. Reference numeral 34 denotes a cutting blade mounted to the front end of the piston rod 22.

Description will now be made with reference to the mode of operation of the hydraulic cutter of this construction. As shown in FIG. 1, the motor 11 is driven as the piston head 21 is located at the most withdrawn position of the cylinder 20 to rotate the motor shaft 12. The cam part 16 is then rotated to reciprocate the piston 17, and the oil inside the oil tank 14 is forcibly fed toward the oil flow path 23. The compressed oil fed by the pump mechanism 15 presses up the opening and closing valve 18 against the biasing force of the spring 19 and is fed to the cylinder interior 20a through the oil flow path 23. The compressed oil forcibly fed to the cylinder interior 20a acts on the flange surface of the piston head 21 to displace the piston head 21 toward the right in FIG. 1. Due to this displacement, the piston rod 22 is also displaced toward the right, and the cutting blade 34 cuts the reinforcing bar or the like.

During the time the piston head 21 is being displaced toward the right inside the cylinder interior 20a, the valve body 27 is biased toward the front surface of the guide bar 26 by the oil pressure, and the through hole 21a and the through hole 26a defining the oil releasing path are blocked. The plate 31 fixed to the piston head 21 is axially slid along the guide bar 26. When the plate 31 slides toward the right to contact the spring 30 and compress it to a predetermined length, the repelling force of the spring 30 overcomes the force of the compressed oil pressing the valve body 27 against the guide bar 26, so that the valve body 27 is instantaneously separated from the front surface of the guide bar 26.

Due to this, the through hole 21a and the through hole 26a are connected and the oil releasing path is opened. The compressed oil inside the cylinder interior 20a flows from the through hole 21a to the through hole 26a, the differential pressure between the two sides of the flange surface of the piston head 21 is equalized, and the displacement of the piston rod 21 toward the right direction is interrupted to complete the cutting operation with the cutting blade 34. The piston head 21 stops and is then returned toward the left in FIG. 1 by the spring 33. During this operation, the valve body 27 is held separated from the front surface of the guide bar 26 by the spring 29 so that the oil releasing path is opened and the displacement of the piston rod 22 toward the left is performed quickly. Although the plate 31 collides with the inner wall of the cylinder 20, the displacement of the piston rod 22 toward the left is interrupted when the valve body 27 is pressed in the central hole 22a of the piston rod 22 to collide with the front surface of the guide bar 26. Then, the piston head 21 is located at a position shown in FIG. 1 to terminate one cutting operation of the hydraulic cutter of this embodiment.

Figure 2:
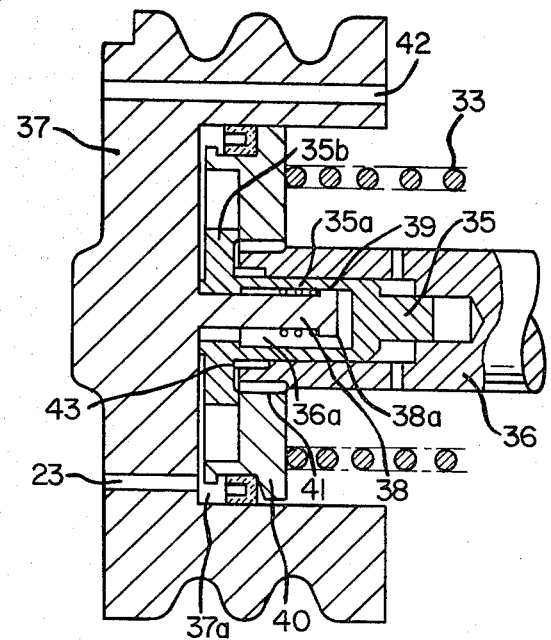
FIGS. 2 and 3 are partial sectional views illustrating other embodiments of the present invention.

FIG. 2 is a partial sectional view illustrating another embodiment of the present invention; it shows the valve mechanism part.

In this embodiment, a valve body 35 comprises a hollow cylindrical part 35a open at one end and a flange part 35b. The hollow cylindrical part 35a is slidably fitted inside a central hole 36a of a piston rod 36. A guide bar 38 protruding in the axial direction of the piston rod 36 from the inner wall of a cylinder 37 is inserted in the hollow cylindrical part 35a. A flange part 38a is formed at the front end of the guide bar 38 to securely fix a spring 39 is mounted on the outer circumference of the guide bar 38. The flange part 38a of the guide bar 38 is of such dimensions that it is capable of contacting the inner end of the flange part 35b of the valve body 35. The guide bar 38 is shifted from the axis of the cylinder 37 so that this flange part 38a is insertable in the central hole 36a. In this embodiment, the oil releasing path is defined by a through hole 41 formed in a piston head 40, and a through hole 42 formed in the cylinder 37 to connect the oil tank (FIG. 1) with the space inside the cylinder 37 at the rear surface of the piston head 40. The through hole 41 formed in the piston head 40 is so constructed that it is opened and closed by the flange part 35b of the valve body 35. Reference numeral 43 denotes a spring mounted between the piston head 40 and the flange part 35b of the valve body 35.

Description will now be made with reference to the mode of operation of the hydraulic cutter of this construction. First, the piston head 40 is located at a position as shown in FIG. 2, and the compressed oil is fed to the cylinder interior 37a through the oil flow path 23. Then, the piston head 40 and the piston rod 36 are displaced toward the right, and the cutting operation is performed on the reinforcing bar or the like as described hereinabove. During the displacement toward the right of the piston heat 40 and the piston rod 36, the flange part 35b of the valve body 35 is pressed against the flange surface of the piston head 40 by the oil pressure to close the through hole 41. The valve body 35 is also displaced toward the right with the displacement of the piston head 40, and the inner end of the flange part 35b presses the spring 39 to deform it by compression. When the spring 39 is deformed by compression a predetermined amount, the repelling force of the spring 39 overcomes the pressing force of the flange part 35b toward the piston head 40 so that the flange part 35b is instantaneously separated from the piston head 40. Due to this, the through hole 41 is opened, and compressed oil inside the cylinder interior 37a flows out through the through hole 41 to the rear surface side of the piston rod 40 and is returned to the oil tank through the through hole 42. The displacement of the piston head 40 and the piston rod 36 is then interrupted, and subsequently the piston head 40 is returned to its original position by the spring 33. During this returning displacement of the piston head 40 toward the left, the flange part 35b is held separated from the piston head 40 by the spring 43 so that the returning displacement is performed smoothly.

Figure 3:
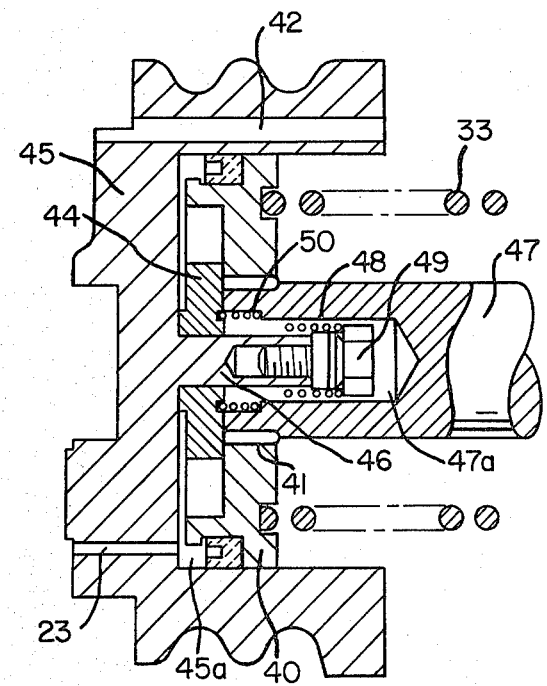

FIG. 3 is a partial sectional view illustrating still another embodiment of the hydraulic cutter of the present invention; it shows the valve mechanism part as in FIG. 2. In this embodiment, a valve body 44 in the form of a plate is slidably fitted to a guide bar 46 axially protruding from the inner wall of a cylinder 45. The guide bar 46 is inserted in a central hole 47a formed in a piston rod 47, and a bolt 49 for securing a spring 48 is screwed to the front end of the guide bar 46. The oil releasing path is defined, as in the case of the embodiment shown in FIG. 2, by the through hole 41 formed in the piston head 40 and the through hole 42 formed in the cylinder 45, and the through hole 41 is opened and closed by the valve body 44. A spring 50 is interposed between the valve body 44 and the piston head 40.

Description will now be made with reference to the mode of operation of the hydraulic cutter of this construction of the present invention. When the piston head 40 is under the condition shown in FIG. 3 and the compressed oil is fed from the sump mechanism (FIG. 1) through the oil flow path 23 to the cylinder interior 45a, the piston head 40 and the piston rod 47 are displaced toward the right in FIG. 3 and the cutting operation is performed. During the time the piston head 40 is displaced toward the right, the valve body 44 is held pressed toward the piston head 40 by the oil pressure. When the valve body 44 slides along the guide bar 46 and compresses the spring 48 a predetermined amount, the valve body 44 is instantaneously separated from the piston head 40 by the repelling force of the spring 48, and the through hole 41 is opened. Consequently, the compressed oil in the cylinder interior 45a flows out to the rear surface side of the piston head 40 through the through hole 41, the displacement of the piston head 40 is interrupted, and the piston head 40 is returned toward the left by the spring 33. During this returning displacement, the valve body 44 is held separated from the piston head 40 by the spring 50 so that the returning displacement may be performed smoothly.

Since the valve body is disposed coaxially with the piston head with the hydraulic cutter of the present invention, space for mounting the valve mechanism shifted from the piston head need not be included, so that the processing becomes easy and the precision is improved. Furthermore, the piston head may be made compact in size and the hydraulic cutter may also be made compact in size. Furthermore, it is unnecessary to include two or more valve mechanisms as in the prior art cutters for balancing the flow of oil, so that the construction may be made simpler and the manufacturing cost may be decreased.

In the embodiment shown in FIG. 1, since the valve body 27 does not slide with the piston head, oil will not leak out due to abrasion or the like even after use over an extended period of time. In the embodiment shown in FIG. 2, since the sliding area between the valve body 35 and the piston rod 36 is great, leakage of the oil may be prevented with certainty. In the embodiment shown in FIG. 3, the construction of the valve body 44 is simple, the manufacture is easy, and the manufacturing cost is decreased.

What is claimed is:

1. A hydraulic cutter apparatus comprising a cylinder having an inlet and outlet passages for a working fluid and a piston head fitted for axial displacement, a piston rod connected at one end to said piston head, a blade secured to the other end of said piston rod, means for biasing said piston head and rod into a non-protruding position, pumping means for feeding said working fluid through said inlet passage into said cylinder for axially displacing said piston head and said piston rod into a protruding position for a cutting operation of said apparatus, and valve means in said outlet passage for releasing the working fluid from said cylinder, thus allowing said piston head and rod to move back from said protruding position, said valve means comprising a valve member having a first position in which said outlet passage is thereby closed and a second position in which the outlet passage is opened, and a guide bar centrally projecting from the inner surface of said cylinder, said valve member being disposed in said guide bar to actuate between said first and second positions in response to displacement of said piston head relative to said cylinder.

2. The hydraulic cutter apparatus defined in claim 1 where said valve means further includes means for temporarily retaining said valve member in said first position while said piston head and rod are displaced back from said protruding position.

* * * * *